(12) United States Patent
Ortmann et al.

(10) Patent No.: US 11,519,885 B2
(45) Date of Patent: Dec. 6, 2022

(54) SAMPLE INJECTOR WITH CONDUIT TIP PENETRATING INTO NEEDLE OPENING

(71) Applicant: Agilent Technologies, Inc., Santa Clara, CA (US)

(72) Inventors: Thomas Ortmann, Straubenhardt/Ottenhausen (DE); Michael Lang, Baden-Wuttemberg (DE); Blasius Nocon, Waldbronn (DE)

(73) Assignee: Agilent Technologies, Inc., Santa Clara, CA (US)

( * ) Notice: Subject to any disclaimer, the term of this patent is extended or adjusted under 35 U.S.C. 154(b) by 29 days.

(21) Appl. No.: 17/239,238

(22) Filed: Apr. 23, 2021

(65) Prior Publication Data
US 2021/0333247 A1 Oct. 28, 2021

(30) Foreign Application Priority Data
Apr. 27, 2020 (DE) .......................... 102020111414.1

(51) Int. Cl.
*G01N 30/22* (2006.01)
*G01N 30/02* (2006.01)

(52) U.S. Cl.
CPC ....... *G01N 30/22* (2013.01); *G01N 2030/027* (2013.01)

(58) Field of Classification Search
CPC .. G01N 2030/185; G01N 30/18; G01N 30/22; G01N 2030/027; G01N 30/16–24; G01N 35/1079; B01D 15/14; F16L 31/00; F16L 37/02–20
See application file for complete search history.

(56) References Cited

U.S. PATENT DOCUMENTS

| | | | |
|---|---|---|---|
| 4,982,597 A | | 1/1991 | Berger |
| 5,032,151 A | * | 7/1991 | Klein ...................... G01N 30/24 96/102 |
| 8,851,528 B2 | | 10/2014 | Van Pelt |
| 9,028,780 B2 | | 5/2015 | Auclair et al. |
| 2002/0006360 A1 | * | 1/2002 | Neal .................. G01N 35/1097 422/501 |

(Continued)

FOREIGN PATENT DOCUMENTS

| DE | 102012217855 A1 * | 4/2014 | ............. G01N 30/16 |
|---|---|---|---|
| DE | 102014109538 A1 | 1/2016 | |

(Continued)

*Primary Examiner* — David L Singer

(57) ABSTRACT

A sample injector for a chromatography system is configured for injecting a sample fluid into a mobile phase, and includes a needle and a conduit. The needle is configured for aspirating the sample fluid and includes a needle tip, a needle channel through the needle for guiding the aspirated sample fluid, and a needle opening at the needle tip into which the needle channel opens. The conduit is configured for fluidically coupling with the needle and includes a conduit tip, and a conduit channel through the conduit for guiding fluid and having a conduit opening at the conduit tip. The conduit tip and the needle tip are configured to be pressed against each other for fluidically coupling the conduit channel with the needle channel, with at least a portion of the conduit tip penetrating into the needle opening for providing the fluidic coupling between the conduit and needle channels.

19 Claims, 5 Drawing Sheets

(56) References Cited

U.S. PATENT DOCUMENTS

| | | | | |
|---|---|---|---|---|
| 2002/0157453 A1* | 10/2002 | van der Maas | ........ | G01N 30/12 |
| | | | | 73/23.35 |
| 2007/0158942 A1* | 7/2007 | Keene | ................... | F16L 15/009 |
| | | | | 285/305 |
| 2010/0189602 A1* | 7/2010 | Baeuerle | ............. | B01D 15/206 |
| | | | | 422/70 |
| 2011/0116973 A1* | 5/2011 | Choikhet | ............... | G01N 30/34 |
| | | | | 422/81 |
| 2012/0096919 A1* | 4/2012 | Choikhet | ............... | G01N 30/24 |
| | | | | 73/1.02 |
| 2013/0134095 A1* | 5/2013 | Anderer | ................. | B01D 15/08 |
| | | | | 210/656 |
| 2014/0116159 A1* | 5/2014 | Zimmerman | .......... | G01N 30/18 |
| | | | | 73/863.01 |
| 2015/0285239 A1* | 10/2015 | Shoykhet | ............... | G01N 30/32 |
| | | | | 417/63 |
| 2016/0138577 A1* | 5/2016 | Shoykhet | ............... | G01N 30/32 |
| | | | | 417/437 |
| 2018/0246073 A1 | 8/2018 | Glatz et al. | | |
| 2021/0077747 A1* | 3/2021 | Bürger | ............... | G01N 35/1095 |

FOREIGN PATENT DOCUMENTS

| | | | | | |
|---|---|---|---|---|---|
| EP | 1577012 | A1 | 9/2005 | | |
| KR | 20090014542 | A | * 2/2009 | ............ | G01N 30/24 |
| WO | 2007124926 | A1 | 11/2007 | | |

\* cited by examiner

SAMPLE INJECTOR WITH CONDUIT TIP PENETRATING INTO NEEDLE OPENING

RELATED APPLICATIONS

This application claims priority under 35 U.S.C. § 119(a) to German Patent Application No. DE 10 2020 111 414.1, filed Apr. 27, 2020, the entire contents of which are incorporated by reference herein.

BACKGROUND ART

The present invention relates to sample injection in particular for chromatographic sample separation.

For liquid separation in a chromatography system, a mobile phase comprising a sample fluid (e.g. a chemical or biological mixture) with compounds to be separated is driven through a stationary phase (such as a chromatographic column packing), thus separating different compounds of the sample fluid which may then be identified. The term compound, as used herein, shall cover compounds which might comprise one or more different components.

The mobile phase, for example a solvent, is pumped under high-pressure typically through a chromatographic column containing packing medium (also referred to as packing material or stationary phase). As the sample is carried through the column by the liquid flow, the different compounds, each one having a different affinity to the packing medium, move through the column at different speeds. Those compounds having greater affinity for the stationary phase move more slowly through the column than those having less affinity, and this speed differential results in the compounds being separated from one another as they pass through the column. The stationary phase is subject to a mechanical force generated in particular by a hydraulic pump that pumps the mobile phase usually from an upstream connection of the column to a downstream connection of the column. As a result of flow, depending on the physical properties of the stationary phase and the mobile phase, a relatively high-pressure drop is generated across the column.

The mobile phase with the separated compounds exits the column and passes through a detector, which registers and/or identifies the molecules, for example by spectrophotometric absorbance measurements. A two-dimensional plot of the detector measurements against elution time or volume, known as a chromatogram, may be made, and from the chromatogram the compounds may be identified. For each compound, the chromatogram displays a separate curve feature also designated as a "peak".

In preparative chromatography systems, a liquid as the mobile phase is provided usually at a controlled flow rate (e.g. in the range of 1 mL/min to thousands of mL/min, e.g. in analytical scale preparative LC in the range of 1-5 mL/min and preparative scale in the range of 4-200 mL/min) and at pressure in the range of tens to hundreds bar, e.g. 20-600 bar.

In high performance liquid chromatography (HPLC), a liquid as the mobile phase has to be provided usually at a very controlled flow rate (e.g. in the range of microliters to milliliters per minute) and at high-pressure (typically 20-100 MPa, 200-1000 bar, and beyond up to currently 200 MPa, 2000 bar) at which compressibility of the liquid becomes noticeable.

In preparative chromatography systems used for chromatography fluidically separating samples at a larger volume, typically in the range of 0.1 mL to tens of mL, there often is a need for analyzing a smaller volume of such sample prior to running the separation of the larger volume (e.g. in the sense of an "analytical scouting run"). For such purpose, an analytical chromatography system may be used for chromatographically separating smaller sample volumes, typically in the range of 10 uL-50 ul. Such analytical chromatography system may be an HPLC system.

The Agilent Dual Loop Sampler G2258A, by the applicant Agilent Technologies, Inc., provides a sampling unit for a combined analytical and preparative chromatography system allowing to inject sample into the analytical as well as the preparative chromatography system.

Sample injectors in chromatography systems are provided for injecting the sample fluid into the mobile phase. Such sample injectors typically comprise a needle for aspirating the sample fluid e.g. from a sample vial. For injecting the (aspirated) sample fluid into the mobile phase, the needle can be inserted into a corresponding needle seat fluidically coupled to a chromatographic column for separating compounds of the sample fluid in the mobile phase.

SUMMARY

It is an object to provide an improved sample injection, in particular by providing an improved fluidic coupling of the needle, preferably for chromatographic sample separation.

According to preferred embodiments of the present invention, a sample injector for a chromatography system is provided. The chromatography system may include a mobile phase drive and a separation unit, wherein the mobile phase drive is configured for driving a mobile phase through the separation unit, and the separation unit is configured for chromatographically separating compounds of a sample fluid in the mobile phase. The sample injector is configured for injecting the sample fluid into the mobile phase and comprises a needle and a conduit. The needle is configured for aspirating the sample fluid and comprises a needle tip (which may be cone shaped, flat or whatever appropriate) on one end, a needle channel through the needle for guiding the aspirated sample fluid, and a needle opening at the needle tip with the needle channel opening into the needle opening. The conduit is configured for fluidically coupling with the needle and comprises a conduit tip (which may be cone shaped, flat or whatever appropriate) on one end, and a conduit channel through the conduit for guiding fluid (such as the sample fluid), and the conduit channel has a conduit opening at the conduit tip. The conduit tip and the needle tip are configured to be pressed against each other for fluidically coupling the conduit channel with the needle channel, and at least a portion of the conduit tip is penetrating into the needle opening for providing the fluidic coupling between the conduit channel and the needle channel. This allows to provide an improved fluidic coupling between the needle and the conduit of the sample injector.

In one embodiment, a surface (preferably an outer surface) of the conduit tip is abutting to a surface (preferably an inner surface) of the needle opening for providing the fluidic coupling between the conduit channel and the needle channel. Preferably, the surface of the conduit tip is sealingly abutting to the surface of the needle opening for providing a fluid tight fluidic coupling between the conduit channel and the needle channel.

In one embodiment, at least one of the needle tip and the conduit tip has a tapered shape. The tapered shape preferably comprises an external cone extending on a lateral side of the tip and decreasing in diameter towards the end of the tip.

In one embodiment, the needle comprises the tapered shape comprising an external cone extending on a lateral side of the needle tip and decreasing in diameter towards the end of the needle tip.

In one embodiment, the conduit comprises the tapered shape comprising an external cone extending on a lateral side of the conduit tip and decreasing in diameter towards the end of the conduit tip. Preferably, the tapered shape of the conduit is configured to match with a shape of the needle opening so that the conduit tip sealingly abuts into the needle opening when the conduit tip and the needle tip are pressed against each other.

In one embodiment, the needle comprises the tapered shape comprising an internal cone extending in the needle opening (preferably from the needle channel) and increasing in diameter towards the end of the needle tip.

In one embodiment, the conduit comprises the tapered shape comprising an internal cone extending in the conduit opening (preferably from the conduit channel) and increasing in diameter towards the end of the conduit tip.

In one embodiment, the needle opening comprises a first tapered shape, preferably comprising an internal cone extending from the needle channel. The first tapered shape increases in diameter towards the end of the needle tip. The conduit tip comprises a second tapered shape, preferably comprising an external cone. The second tapered shape extends on a lateral side of the conduit tip and decreases in diameter towards the end of the conduit tip. The first tapered shape is configured to match with the second tapered shape so that the conduit tip sealingly abuts into the needle opening of the needle tip when the conduit tip and the needle tip are pressed against each other.

In one embodiment, the needle tip has a non-symmetrical shape having a cut-off portion being cut off in an angle with respect to the elongated shape of the needle. The needle tip may comprise a tapered inner portion, wherein the needle opening is increasing in diameter towards the end of the needle tip.

In one embodiment, the needle comprises an elongated shape, preferably a cylindrical shape.

In one embodiment, the needle channel is configured for at least partly buffering the aspirated sample fluid.

In one embodiment, the conduit comprises an elongated shape, preferably a cylindrical shape.

In one embodiment, the conduit is or comprises a capillary.

In one embodiment, the conduit is or comprises a fluidic coupling piece.

In one embodiment, the conduit is provided by one or more materials selected from the group of: glass, ceramic, plastic, polymer, and metal, and the conduit tip may be provided by a different material than other parts of the conduit. The conduit may be embodied as a replaceable component e.g. external to the needle seat and can be inserted into and mechanically secured and fixed by the needle seat.

In one embodiment, the needle is provided by one or more materials selected from the group of metal, glass, ceramic, plastic, and polymer, and the needle tip may be provided by a different material than other parts of the needle. The needle may be embodied as a replaceable component which may be inserted into and mechanically secured and fixed by the handling unit.

While all material combinations for the conduit and the needle, as afore-described, may be applied (in particular dependent on the respective application), the materials of the conduit and the needle, in particular the materials provided for or at the conduit tip and the needle tip, if different from other parts of the conduit and/or the needle, are preferably selected to match with each other, in particular with respect to sealing properties.

In one embodiment, the sample injector comprises a needle seat configured for receiving from one side the needle and from another side (preferably opposing the side receiving the needle) the conduit.

In one embodiment, the needle seat is configured for pressing the conduit tip and the needle tip against each other, preferably for elastically pressing the conduit tip and the needle tip against each other.

In one embodiment, the conduit is fixedly coupled to the first needle seat, preferably providing an elastic bias in an axial direction of the conduit when the conduit tip and the needle tip are pressed against each other.

In one embodiment, the needle seat comprises a gripping element configured for gripping and fastening the conduit to the needle seat in order to axially fix a spatial position of the conduit tip with respect to a spatial position of the needle tip when being received in the needle seat, wherein the gripping element preferably comprises a spring element configured for elastically biasing the conduit tip against the needle tip when being received in the needle seat.

In one embodiment, a separation system is provided for separating compounds of a sample fluid in a mobile phase. The fluid separation system comprises a mobile phase drive, preferably a pumping system, adapted to drive the mobile phase through the fluid separation system, and a separation unit, preferably a chromatographic column, adapted for separating compounds of the sample fluid in the mobile phase. The separation system further comprises a sample injector according to any one of the afore-described embodiments adapted to introduce the sample fluid into the mobile phase.

In one embodiment, the separation system further comprises one or more of: a detector adapted to detect separated compounds of the sample fluid; a collection unit adapted to collect separated compounds of the sample fluid; a data processing unit adapted to process data received from the fluid separation system; and a degassing apparatus for degassing the mobile phase.

In one embodiment, a method of operating a sample injector for a chromatography system is provided. The chromatography system comprises a mobile phase drive and a separation unit. The mobile phase drive is configured for driving a mobile phase through the separation unit, and the separation unit is configured for chromatographically separating compounds of a sample fluid in the mobile phase. The sample injector is configured for injecting the sample fluid into the mobile phase and comprises a needle and a conduit. The needle is configured for aspirating the sample fluid. The needle comprises a needle tip on one end, a needle channel through the needle for guiding the aspirated sample fluid, and a needle opening at the needle tip with the needle channel opening into the needle opening. The conduit is configured for fluidically coupling with the needle. The conduit comprises a conduit tip on one end, a conduit channel through the conduit for guiding fluid, and the conduit channel has a conduit opening at the conduit tip. The method comprises penetrating at least a portion of the conduit tip into the needle opening, and pressing the conduit tip and the needle tip against each other for fluidically coupling the conduit channel with the needle channel.

In one embodiment of the method, pressing the conduit tip and the needle tip against each other comprises: abutting a surface (preferably an outer surface) of the conduit tip to a surface (preferably an inner surface) of the needle opening for providing the fluidic coupling between the conduit channel and the needle channel. Preferably, the surface of the conduit tip is sealingly abutting to the surface of the needle opening for providing a fluid tight fluidic coupling between the conduit channel and the needle channel.

Embodiments of the present invention might be embodied based on most conventionally available HPLC systems, such as the Agilent 1220, 1260 and 1290 Infinity LC Series (provided by the applicant Agilent Technologies).

One embodiment of an HPLC system comprises a pumping apparatus having a piston for reciprocation in a pump working chamber to compress liquid in the pump working chamber to a high pressure at which compressibility of the liquid becomes noticeable.

The separating device preferably comprises a chromatographic column providing the stationary phase. The column might be a glass, metal, ceramic or a composite material tube (e.g. with a diameter from 50 µm to 5 mm and a length of 1 cm to 1 m) or a microfluidic column (as disclosed e.g. in EP 1577012 A1 or the Agilent 1200 Series HPLC-Chip/MS System provided by the applicant Agilent Technologies). The individual components are retained by the stationary phase differently and separate from each other while they are propagating at different speeds through the column with the eluent. At the end of the column they elute at least partly separated from each other. During the entire chromatography process the eluent might be also collected in a series of fractions. The stationary phase or adsorbent in column chromatography usually is a solid material. The most common stationary phase for column chromatography is silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface, which can be especially chemically modified, though in EBA a fluidized bed is used.

The mobile phase (or eluent) can be either a pure solvent or a mixture of different solvents. It can also contain additives, i.e. be a solution of the said additives in a solvent or a mixture of solvents. It can be chosen e.g. to adjust the retention of the compounds of interest and/or the amount of mobile phase to run the chromatography. The mobile phase can also be chosen so that the different compounds can be separated effectively. The mobile phase might comprise an organic solvent like e.g. methanol or acetonitrile, often diluted with water. For gradient operation water and organic solvent are delivered in separate containers, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid might comprise any type of process liquid, natural sample like juice, body fluids like plasma or it may be the result of a reaction like from a fermentation broth.

The fluid is preferably a liquid but may also be or comprise a gas and/or a supercritical fluid (as e.g. used in supercritical fluid chromatography—SFC—as disclosed e.g. in U.S. Pat. No. 4,982,597 A).

The pressure in the mobile phase might range from 2-200 MPa (20 to 2000 bar), in particular 10-150 MPa (100 to 1500 bar), and more particularly 50-130 MPa (500 to 1300 bar).

The HPLC system might further comprise a detector for detecting separated compounds of the sample fluid, a fractionating unit for outputting separated compounds of the sample fluid, or any combination thereof. Further details of HPLC system are disclosed with respect to the aforementioned Agilent HPLC series, provided by the applicant Agilent Technologies.

Embodiments of the invention can be partly or entirely embodied or supported by one or more suitable software programs or products (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines e.g., computer-executable or machine-executable instructions or code) can be preferably applied in or by the control unit, e.g. a data processing system such as a computer, preferably for executing any of the methods described herein. For example, one embodiment of the present disclosure provides a non-transitory computer-readable medium that includes instructions stored thereon, such that when executed on a processor, the instructions perform the steps of the method of any of the embodiments disclosed herein.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or finer separated by the first separation criterion, thereby splitting up or separating a separate fraction into a plurality of sub-fractions.

In the context of this application, the term "sample separation apparatus", "fluid separation apparatus" or similar may particularly denote any apparatus which is capable of separating different fractions of a fluidic sample by applying a certain separation technique. Particularly, two separation apparatus may be provided in such a sample separation apparatus when being configured for a two-dimensional separation. This means that the sample is first separated in accordance with a first separation criterion, and at least one or some of the fractions resulting from the first separation are subsequently separated in accordance with a second, different, separation criterion or more finely separated in accordance with the first separation criterion.

The term "separation unit", "separation device" or similar may particularly denote a fluidic member through which a fluidic sample is transferred, and which is configured so that, upon conducting the fluidic sample through the separation unit, the fluidic sample will be separated into different groups of molecules or particles (called fractions or sub-fractions, respectively). An example for a separation unit is a liquid chromatography column which is capable of trapping or retaining and selectively releasing different fractions of the fluidic sample.

In the context of this application, the term "fluid drive", "mobile phase drive" or similar may particularly denote any kind of pump which is configured for forcing a flow of mobile phase and/or a fluidic sample along a fluidic path.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

DETAILED DESCRIPTION

Figure 1:
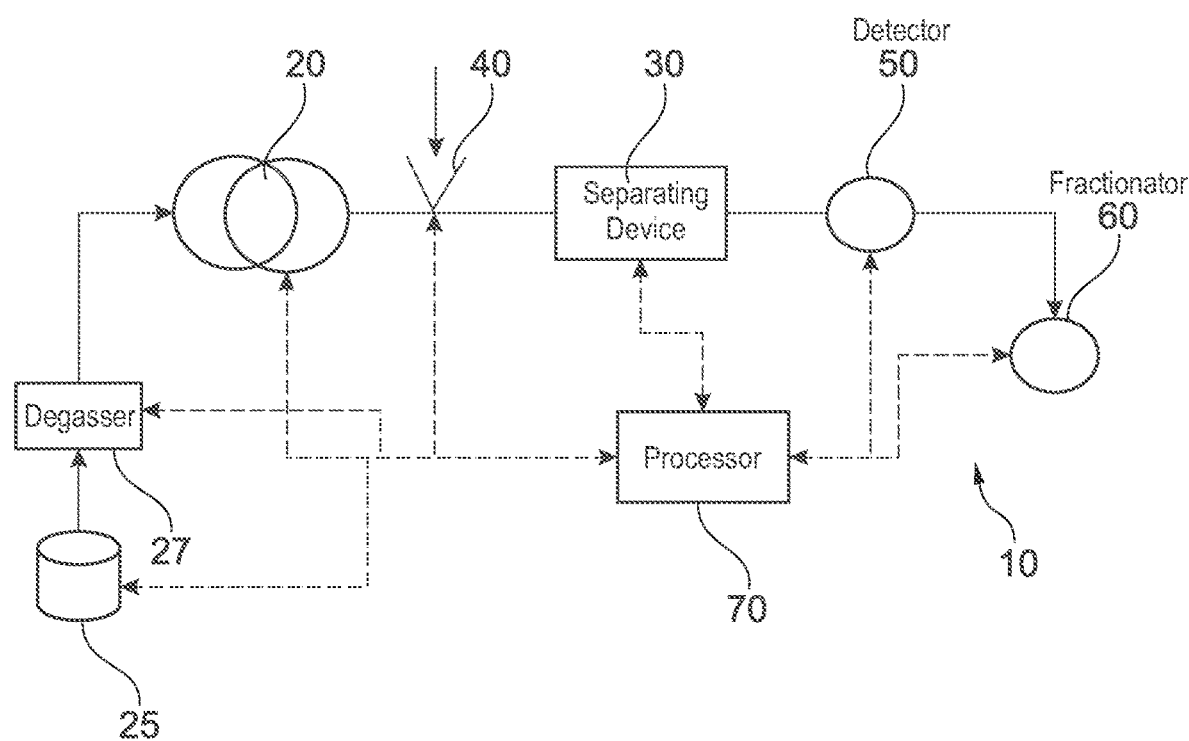
FIG. 1 illustrates a liquid chromatography system according to an exemplary embodiment.

Referring now in greater detail to the drawings, FIG. 1 depicts a general schematic of a liquid separation system 10. A mobile phase drive 20 (such as a pump) receives a mobile phase from a solvent supply 25, typically via a degasser 27, which degases the mobile phase and thus reduces the amount of dissolved gases in it. The mobile phase drive 20 drives the mobile phase through a separating device 30 (such as a chromatographic column). A sample injector 40 (also referred to as sample introduction apparatus, sample dispatcher, etc.) is provided between the mobile phase drive 20 and the separating device 30 in order to subject or add (often referred to as sample introduction) portions of one or more sample fluids into the flow of a mobile phase. The separating device 30 is adapted for separating compounds of the sample fluid, e.g. a liquid. A detector 50 is provided for detecting separated compounds of the sample fluid. A fractionating unit 60 can be provided for outputting separated compounds of sample fluid. In one embodiment, at least parts of the sample injector 40 and the fractionating unit 60 can be combined, e.g. in the sense that some common hardware is used as applied by both of the sample injector 40 and the fractionating unit 60.

The separating device 30 may comprise a stationary phase configured for separating compounds of the sample fluid. Alternatively, the separating device 30 may be based on a different separation principle (e.g. field flow fractionation).

While the mobile phase can be comprised of one solvent only, it may also be mixed of plurality of solvents. Such mixing might be a low pressure mixing and provided upstream of the mobile phase drive 20, so that the mobile phase drive 20 already receives and pumps the mixed solvents as the mobile phase. Alternatively, the mobile phase drive 20 might be comprised of plural individual pumping units, with plural of the pumping units each receiving and pumping a different solvent or mixture, so that the mixing of the mobile phase (as received by the separating device 30) occurs at high pressure and downstream of the mobile phase drive 20 (or as part thereof). The composition (mixture) of the mobile phase may be kept constant over time, the so-called isocratic mode, or varied over time, the so-called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the mobile phase drive 20 (e.g. setting control parameters) and receive therefrom information regarding the actual working conditions (such as output pressure, flow rate, etc. at an outlet of the pump 20). The data processing unit 70 might also control operation of the solvent supply 25 (e.g. monitoring the level or amount of the solvent available) and/or the degasser 27 (e.g. setting control parameters such as vacuum level) and might receive therefrom information regarding the actual working conditions (such as solvent composition supplied over time, flow rate, vacuum level, etc.). The data processing unit 70 might further control operation of the sample injector 40 (e.g. controlling sample introduction or synchronization of the sample introduction with operating conditions of the mobile phase drive 20). The separating device 30 might also be controlled by the data processing unit 70 (e.g. selecting a specific flow path or column, setting operation temperature, etc.), and send—in return—information (e.g. operating conditions) to the data processing unit 70. Accordingly, the detector 50 might be controlled by the data processing unit 70 (e.g. with respect to spectral or wavelength settings, setting time constants, start/stop data acquisition), and send information (e.g. about the detected sample compounds) to the data processing unit 70. The data processing unit 70 might also control operation of the fractionating unit 60 (e.g. in conjunction with data received from the detector 50) and provide data back. The data processing unit 70 might also process the data received from the system or its part and evaluate it in order to represent it in adequate form prepared for further interpretation.

Figure 2:
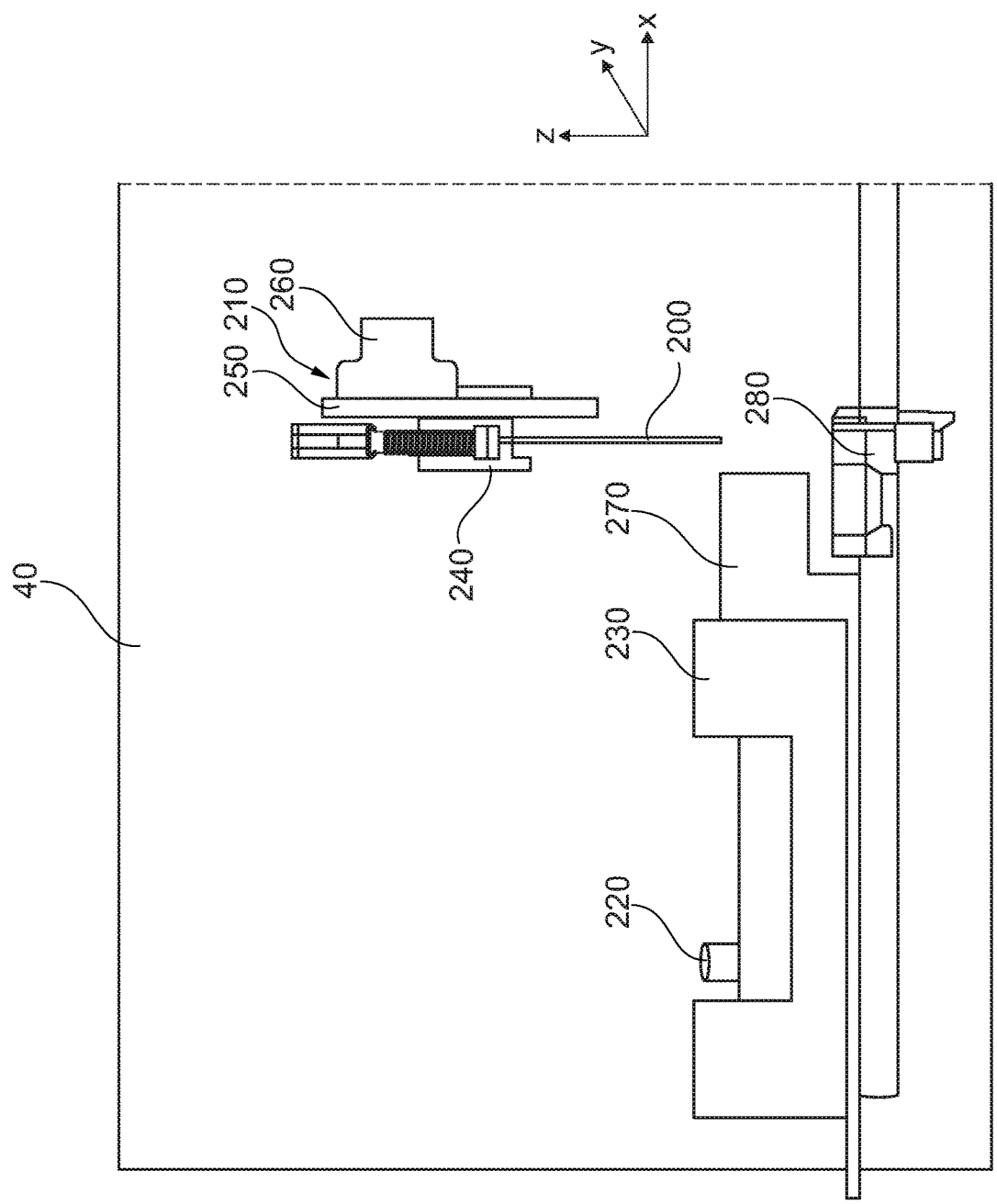
FIG. 2 illustrates a sample injector that may be provided in the liquid chromatography system according to an exemplary embodiment.

FIG. 2 illustrates in greater detail an embodiment of the sample injector 40. The sample injector 40 comprises a needle 200 and a handling unit 210 configured for moving and positioning the needle 200. One or more receptacles 220, which may comprise e.g. a sample fluid to be injected by the sample injector 40, can be provided e.g. in a tray 230, such as a vial plate or any other container as known in the art. In the example of FIG. 2, only one receptacle 220 shall be represented for the sake of simplicity.

The positioning of the needle 200 as provided by the handling unit 210 may be only in Z-direction, as indicated in the axis diagram, allowing to position the needle 200 in (only) height e.g. by lowering or lifting the needle 200 in Z-direction. For such purpose, the handling unit 210 may comprise a slider 240 configured to slide in Z-direction along a guide 250, e.g. operated by a drive unit 260 which may be an electrical motor.

The handling unit 210 may further be configured to move and position the needle 200 into the X-direction and/or into the Y-direction (as indicated in the axis diagram), as readily known in the art.

The tray 230 as shown in the embodiment of FIG. 2 is positioned on a movable sleigh 270, which may be moved into the X-direction and/or into the Y-direction (as indicated in the axis diagram), as readily known in the art, in order to position the one or more receptacles 220 with respect to the needle 200.

In the exemplary embodiment of FIG. 2, the sleigh 270 is configured to be movable in X-direction, while the handling unit 210 is configured to move the needle 200 as well in Z-direction as in Y-direction. However, it is clear that other mechanisms of (relative) movement may be applied accordingly, including rotational movements and combinations thereof.

A needle seat 280 is provided into which the needle 200 can be seated (e.g. by operation of the handling unit 210) allowing to fluidically couple the needle 200 with the high-pressure flow path between the pump 20 and the separating device 30 of the liquid separation system 10, e.g. in order to inject a sample fluid (aspirated into the needle 200 from the container 220) into such high pressure flow path for chromatographic separation by the separating device 30. Such injection may be by feed injection, as described e.g. in U.S. Patent Application Publication No. US2017343520A1, the entire contents of which are incorporated by reference herein, and/or by flow through injection, as described e.g. in U.S. Patent Application Publication No. US20160334031A1, the entire contents of which are incorporated by reference herein.

Figure 3:
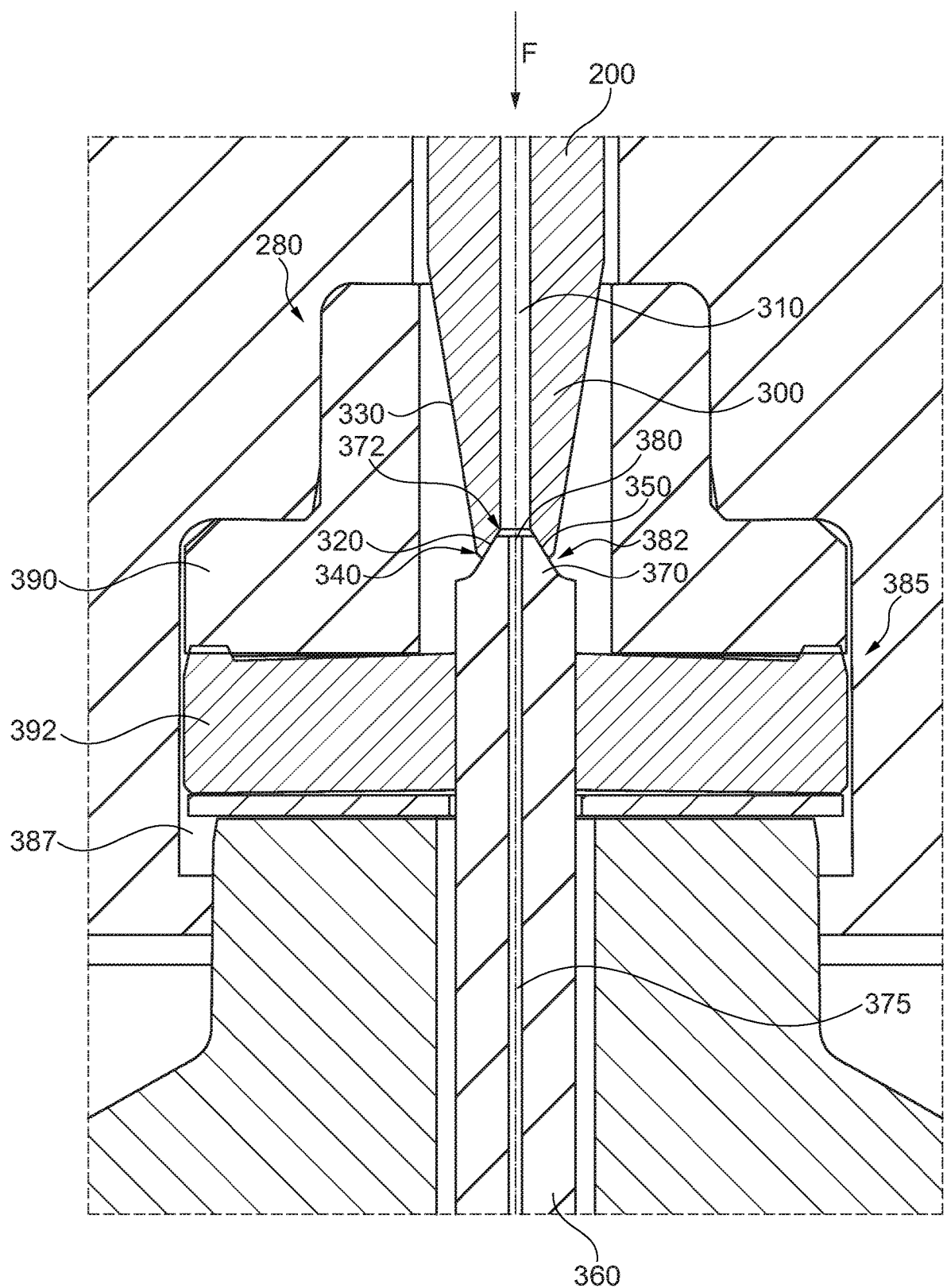
FIG. 3 illustrates a needle being seated into a needle seat of the sample injector according to an exemplary embodiment.

FIG. 3 shows in greater detail and in a two-dimensional cut-through representation an embodiment of the needle 200 being seated into the needle seat 280. The needle 200 has an elongated, preferably cylindrical shape with a needle tip 300. In contrast to FIG. 2, where the needle 200 is physically separated from the needle seat 280, the needle 200 in FIG. 3 is represented as being seated into the needle seat 280, so that a portion of the needle 200, preferably the needle tip 300, is penetrating into the needle seat 280 and fluidically coupling thereto.

A needle channel 310 is extending through the needle 200 for guiding (and preferably also buffering at least a portion of the) sample fluid aspirated by the needle 200. The needle channel 310 is opening into a needle opening 320 at the needle tip 300. In the embodiment of FIG. 3, the needle tip 300 has a conical outer shape 330 with an outer diameter of the needle 200 decreasing towards an end 340 of the needle tip 300. It is clear that the conical outer shape 330 can have any appropriate form and does not necessarily need to be a linear cone as shown in the exemplary embodiment of FIG. 3.

The needle tip 300 further has a conical inner shape 350 with a diameter increasing from the needle channel 310 towards the end 340 of the needle tip 300. Also here, the conical inner shape 350 can have any appropriate form and does not necessarily need to be a linear cone as shown in the exemplary embodiment of FIG. 3.

The needle seat 280 comprises a conduit 360 having an elongated, preferably cylindrical shape and being configured for fluidically coupling with the needle 200. The conduit 360 has a conduit tip 370 on one end 372. A conduit channel 375 is extending through the conduit 360 for guiding fluid (such as the sample fluid). The conduit channel 375 is opening into a conduit opening 380 at the conduit tip 370.

The conduit tip 370 has a conical outer shape 382 with an outer diameter of the conduit 360 decreasing towards the end 372 of the conduit tip 370. It is clear that the conical outer shape 382 can have any appropriate form and does not necessarily need to be as shown in the exemplary embodiment of FIG. 3 with a substantial linear cone at and towards the end 372 and being rounded out towards the outer diameter of the conduit 360.

The needle seat 280 further comprises a gripping element 385 configured for gripping and fastening the conduit 360 to the needle seat 280 in order to fix (e.g. axially) a spatial position of the conduit tip 370, preferably with respect to a spatial position of the needle tip 300 when the needle 200 is received into the needle seat 280. The gripping element 385 is either housed in or part of a housing 387 of the needle seat 280. The housing 387 may comprise additional components such as an upper needle holder 390, as well known in the art and which does not need to be detailed herein.

The gripping element 385 spatially fixes the conduit 360 to a defined spatial position within the needle seat 280 in order to ensure that the required sealing force for providing a fluid tight sealing can be ensured and achieved.

The gripping element 385 may comprise a holding element 392, which may be embodied as a plate spring, disk spring, or any other type of spring for elastically biasing the conduit tip 370 against the needle tip 300 when being received in the needle seat 280.

The conduit 360 may be fixedly coupled with the holding element 392, e.g. by welding, clamping or the like.

While the conduit 360 is held and positioned (e.g. axially) by the gripping element 385, the needle 200 is preferably pressed into the needle seat 280 by the handling unit 210. Alternative mechanical configurations for holding and pressing the needle 200 against the needle seat 280 are also possible and may allow to further use the handling unit 210 after e.g. positioning the needle 200 into the needle seat 280 and decoupling the needle 200 from the handling unit 210.

The conduit 360 can be a capillary or any other tubing and may be provided by any adequate material such as glass, ceramic, plastic, polymer, metal, et cetera. The conduit 360 is preferably embodied as a replaceable component external to the needle seat 280 which can be inserted into and mechanically secured and fixed by the needle seat 280.

The needle 200 may be provided by any adequate material such as metal, glass, ceramic, plastic, polymer, et cetera, and may be embodied as a replaceable component which can be inserted into and mechanically secured and fixed by the handling unit 210.

While all material combinations for the conduit 360 and the needle 200, as listed above, may be applied (in particular dependent on the respective application), the materials of the conduit 360 and the needle 200, in particular the materials provided at the conduit tip 370 and the needle tip 300, if different from other parts of the conduit 260 and/or the needle 200, are preferably selected to match with each other, in particular with respect to sealing properties.

When the needle 200 is received into the needle seat 280, the needle tip 300 and the conduit tip 370 are preferably pressed against each other e.g. by applying an axial force F as schematically indicated in FIG. 3. It is clear that such axial force F can be provided by either one or both of the needle tip 300 and the conduit tip 370 and represents a resulting force for achieving a fluid tight coupling between the needle 200 and the conduit 360 (and in particular between the needle channel 310 and the conduit channel 375).

The needle tip 300 and the conduit tip 370 can be elastically pressed against each other, e.g. by providing a spring force (for example by the holding element 392), in order to avoid damaging as may result from a hard abutting and/or to ensure continuing pressing force F even when the relative position of the needle tip 300 and the conduit tip 370 with respect to each other may vary over time.

When the conduit tip 370 and the needle tip 300 are pressed against each other for fluidically coupling the conduit channel 375 with the needle channel 310, at least a portion of the conduit tip 370 is penetrating into the needle opening 320 for providing the fluidic coupling between the conduit channel 375 and the needle channel 310. With the conical outer shape 382 of the conduit 360 substantially matching with the conical inner shape 350 of the needle 200, the conduit tip 370 and the needle tip 300 will provide a cone to cone coupling allowing to provide a sealing coupling between the conduit tip 370 and the needle tip 300.

It is clear that there does not need to be a cone to cone coupling between the conduit tip 370 and the needle tip 300 to provide a fluid tight and sealing coupling between the conduit tip 370 and the needle tip 300, and that other coupling types (in particular shape coupling) can be provided as well. As an example, only one of the conduit tip 370 and the needle tip 300 may have a cone shape while the other may have another appropriate shape, such as a flat shape (i.e. a flat front face facing towards the respective other component), rounded shape, et cetera. Alternatively, but less preferred, none of the conduit tip 370 and the needle tip 300 may be provided with a cone shape or similar shape having varying outer/inner diameter for providing the sealing coupling with respect to each other. As an example, the conduit tip 370 may have e.g. a flat shape (i.e. a flat front face facing towards the needle tip 300) and bearing an elastic sealing material, such as a sealing ring, and the sealing material being elastically deformed while pressing the conduit tip 370 and the needle tip 300 against each other, thus providing an adequate fluid tight sealing.

Cone to cone shape coupling has been found to provide a reliable sealing surface which also can be fairly tolerant towards a mismatch e.g. in axial alignment between the conduit tip 370 and the needle tip 300. This can further be improved by adequately designing the respective cone angles with respect to each other, as readily known in the art. The cone angles can be designed to be substantially equal (e.g. within manufacturing tolerances) or different. Preferably, the outer "male" cone can be designed having a smaller cone angle than the corresponding inner "female" cone. As an example, the outer "male" cone may have a cone angle of 58° and the inner "female" cone has a cone angle of 60°. It goes without saying that the specific angles depend on the specific application and mechanical configuration and are only to be understood as exemplary.

Further, it is also clear that the needle 200 does not necessarily need to have the conical outer shape 330, but the needle 200 may also have a substantially constant outer diameter until the end 340 of the needle 200, or the needle 200 may have any other shape known in the art and as will also be shown later. However, in many applications the conical outer shape 330 may be very useful e.g. for piercing through a top sealing (such as a foil) of the receptacle 220.

Figure 4:
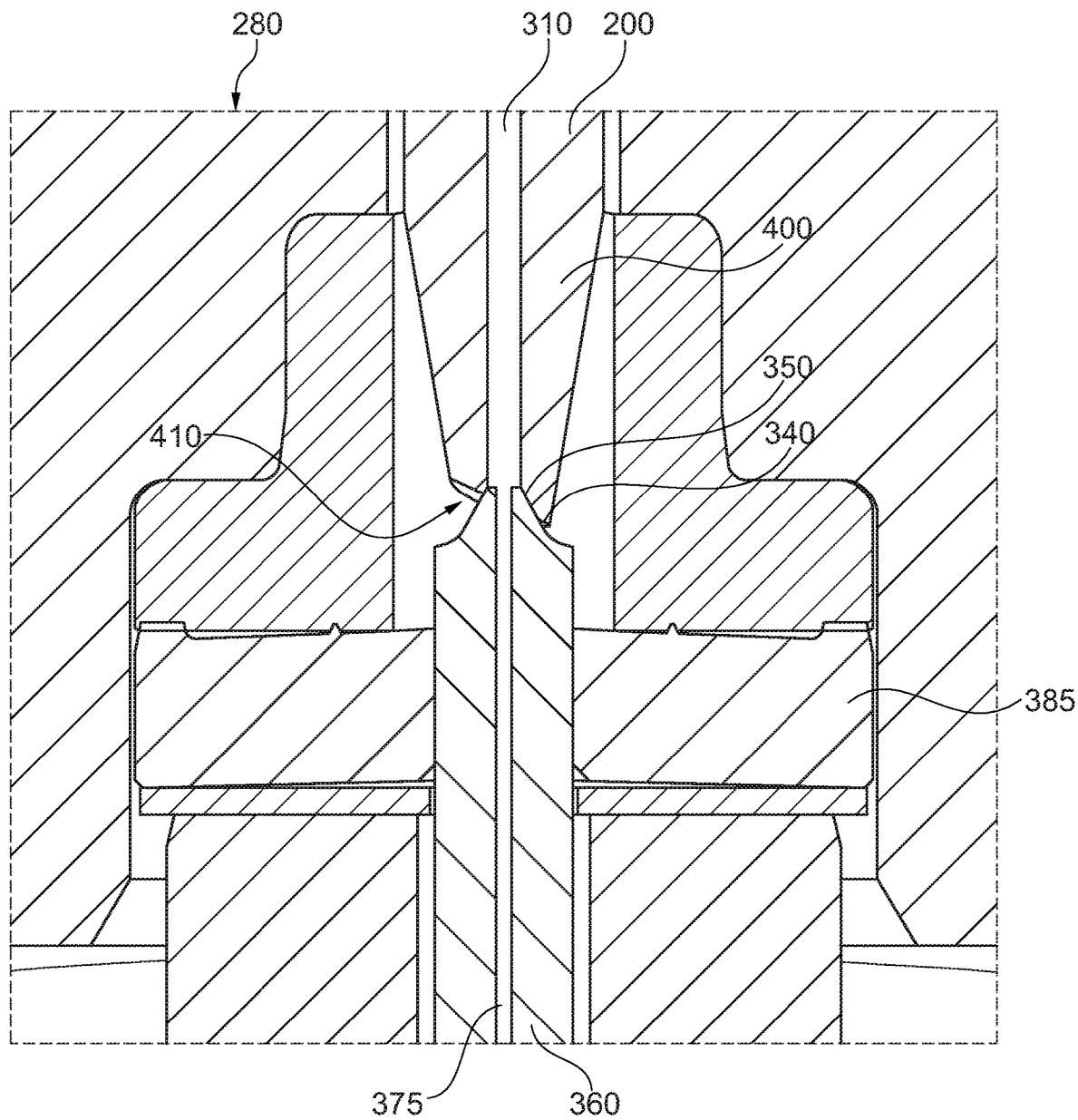
FIG. 4 illustrates a needle according to another embodiment.
Figure 5A:
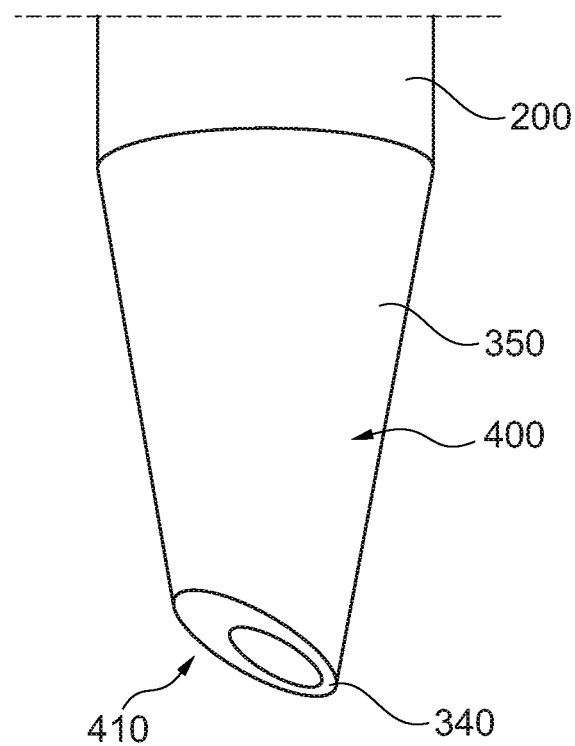
FIG. 5A illustrates another view of the needle illustrated in FIG. 4.
Figure 5B:
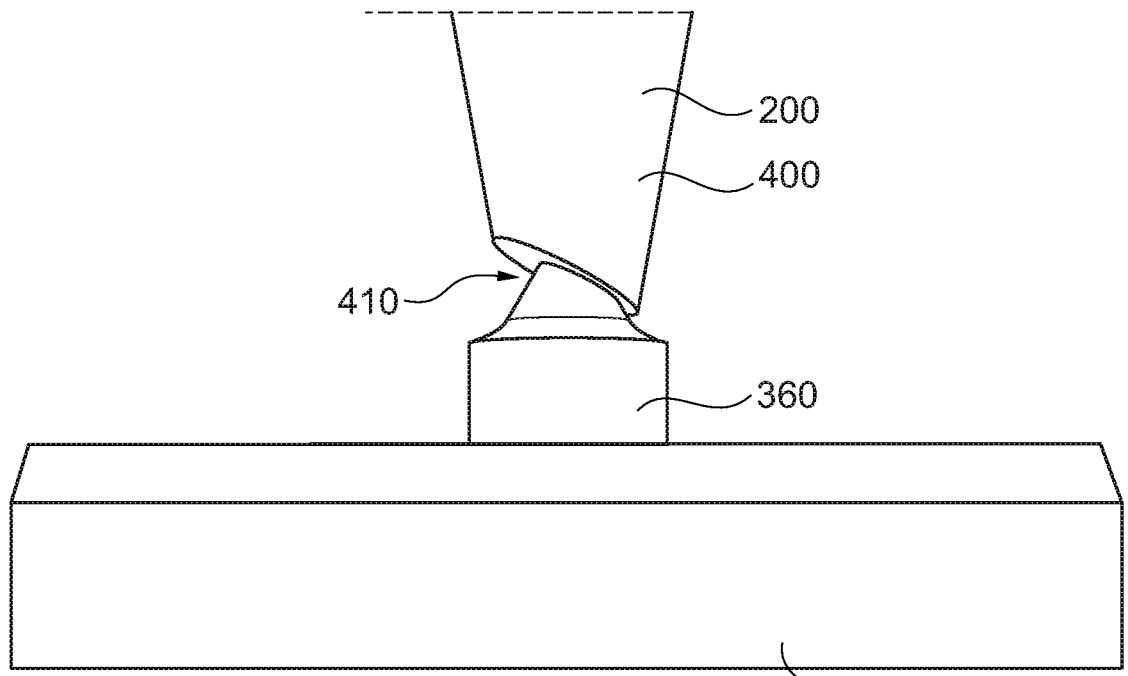
FIG. 5B illustrates another view of the needle illustrated in FIG. 4.

FIG. 4 shows in a three-dimensional cut-through representation another embodiment of the needle 200 being seated into the needle seat 280. The main difference over the embodiment of FIG. 3 is the different shaping of the needle 200, which is also shown in three-dimensional representation in FIGS. 5A-B. The needle 200 in the embodiments of FIGS. 4 and 5A-B comprises a needle tip 400 having a non-symmetrical shape.

Similar to the needle tip 300, the needle tip 400 also has the conical inner shape 350 with a diameter increasing from the needle channel 310 towards the end 340 of the needle tip 400. Also here, the conical inner shape 350 can have any appropriate form and does not necessarily need to be a linear cone as shown in the exemplary embodiment of FIG. 4.

As in the embodiment of FIG. 3, the needle tip 400 also comprises the conical inner shape 350, wherein the needle opening 320 is increasing in diameter towards the end 340 of the needle tip 400.

The needle tip 400 further comprises a cut-off portion 410 being cut off in an angle with respect to the elongated shape of the needle 200.

The invention claimed is:

1. A sample injector for a chromatography system, the chromatography system comprising a mobile phase drive and a separation unit, wherein the mobile phase drive is configured for driving a mobile phase through the separation unit, and the separation unit is configured for chromatographically separating compounds of a sample fluid in the mobile phase, the sample injector being configured for injecting the sample fluid into the mobile phase and comprising:
   a needle configured for aspirating the sample fluid, wherein the needle comprises a needle tip on one end, a needle channel through the needle for guiding the aspirated sample fluid, and a needle opening at the needle tip with the needle channel opening into the needle opening; and
   a conduit configured for fluidically coupling with the needle, wherein the conduit comprises a conduit tip on one end, and a conduit channel through the conduit for guiding fluid, and the conduit channel has a conduit opening at the conduit tip,
   wherein the conduit tip and the needle tip are configured to be pressed against each other for fluidically coupling the conduit channel with the needle channel, and at least a portion of the conduit tip is penetrating into the needle opening for providing the fluidic coupling between the conduit channel and the needle channel.

2. The sample injector of claim 1, comprising at least one of:
   a surface of the conduit tip is abutting to a surface of the needle opening for providing the fluidic coupling between the conduit channel and the needle channel;
   a surface of the conduit tip is sealingly abutting to a surface of the needle opening for providing a fluid tight fluidic coupling between the conduit channel and the needle channel.

3. The sample injector of claim 1, wherein:
   at least one of the needle tip or the conduit tip has a tapered shape.

4. The sample injector of claim 3, comprising at least one of:
   the tapered shape comprises an external cone extending on a lateral side of the needle tip or the conduit tip and decreasing in diameter towards the end of the needle tip or the conduit tip;
   the needle comprises the tapered shape comprising an external cone extending on a lateral side of the needle tip and decreasing in diameter towards the end of the needle tip;
   the needle comprises the tapered shape comprising an internal cone extending in the needle opening and increasing in diameter towards the end of the needle tip;
   the conduit comprises the tapered shape comprising an internal cone extending in the conduit opening and increasing in diameter towards the end of the conduit tip.

5. The sample injector of claim 1, wherein:
   the conduit comprises a tapered shape comprising an external cone extending on a lateral side of the conduit tip and decreasing in diameter towards the end of the conduit tip.

6. The sample injector of claim 5, wherein:
the tapered shape of the conduit is configured to match with a shape of the needle opening so that the conduit tip sealingly abuts into the needle opening when the conduit tip and the needle tip are pressed against each other.

7. The sample injector of claim 1, wherein:
the needle opening comprises a first tapered shape extending from the needle channel and increasing in diameter towards the end of the needle tip, and the conduit tip comprises a second tapered shape extending on a lateral side of the conduit tip and decreasing in diameter towards the end of the conduit tip, wherein the first tapered shape is configured to match with the second tapered shape so that the conduit tip sealingly abuts into the needle opening of the needle tip when the conduit tip and the needle tip are pressed against each other.

8. The sample injector of claim 7, wherein:
the first tapered shape comprises an internal cone and the second tapered shape comprises an external cone.

9. The sample injector of claim 1, wherein:
the needle tip has a non-symmetrical shape comprising a tapered inner portion, wherein the needle opening is increasing in diameter towards the end of the needle tip, and a cut-off portion being cut off in an angle with respect to the elongated shape of the needle.

10. The sample injector of claim 1, comprising at least one of:
the needle comprises an elongated shape;
the needle comprises a cylindrical shape;
the needle channel is configured for at least partly buffering the aspirated sample fluid;
the conduit comprises an elongated shape;
the conduit comprises a cylindrical shape;
the conduit comprises a capillary;
the conduit comprises a fluidic coupling piece.

11. The sample injector of claim 1, comprising:
a needle seat configured for receiving from one side the needle and from another side the conduit.

12. The sample injector of claim 11, comprising at least one of:
the needle seat is configured for pressing the conduit tip and the needle tip against each other;
the needle seat is configured for elastically pressing the conduit tip and the needle tip against each other;
the conduit is fixedly coupled to the needle seat;
the needle seat is configured to provide an elastic bias in an axial direction of the conduit when the conduit tip and the needle tip are pressed against each other.

13. The sample injector of claim 11, wherein:
the needle seat comprises a gripping element configured to grip and fasten the conduit to the needle seat in order to axially fix a spatial position of the conduit tip with respect to a spatial position of the needle tip when being received in the needle seat.

14. The sample injector of claim 13, wherein:
the gripping element comprises a spring element configured to elastically bias the conduit tip against the needle tip when being received in the needle seat.

15. A separation system for separating compounds of a sample fluid in a mobile phase, the fluid separation system comprising:
a mobile phase drive configured to drive the mobile phase through the fluid separation system;
a separation unit configured to separate compounds of the sample fluid in the mobile phase; and
the sample injector of claim 1 configured to introduce the sample fluid into the mobile phase.

16. The separation system of claim 15, further comprising at least one of:
a detector configured to detect separated compounds of the sample fluid;
a collection unit configured to collect separated compounds of the sample fluid;
a data processing unit configured to process data received from the fluid separation system;
a degassing apparatus configured to degas the mobile phase.

17. A method of operating a sample injector for a chromatography system, the chromatography system comprising a mobile phase drive and a separation unit, wherein the mobile phase drive is configured for driving a mobile phase through the separation unit, and the separation unit is configured for chromatographically separating compounds of a sample fluid in the mobile phase, the method comprising:
providing the sample injector, wherein the sample injector is configured to inject the sample fluid into the mobile phase and comprises:
a needle configured for aspirating the sample fluid, wherein the needle comprises a needle tip on one end, a needle channel through the needle for guiding the aspirated sample fluid, and a needle opening at the needle tip with the needle channel opening into the needle opening; and
a conduit configured for fluidically coupling with the needle, wherein the conduit comprises a conduit tip on one end, a conduit channel through the conduit for guiding fluid, and the conduit channel has a conduit opening at the conduit tip;
penetrating at least a portion of the conduit tip into the needle opening; and
pressing the conduit tip and the needle tip against each other for fluidically coupling the conduit channel with the needle channel.

18. The method of claim 17, wherein pressing the conduit tip and the needle tip against each other comprises:
abutting a surface of the conduit tip to a surface of the needle opening for providing the fluidic coupling between the conduit channel and the needle channel.

19. A non-transitory computer-readable medium with instructions stored thereon, that when executed by a processor, control or execute the steps of the method of claim 17.

* * * * *